(12) United States Patent  (10) Patent No.: US 8,573,986 B2
Holmes  (45) Date of Patent: *Nov. 5, 2013

(54) SIM CARD ADAPTOR

(71) Applicant: Sharpe Innovations, Inc., Greenville, NC (US)

(72) Inventor: Cameron Alan Holmes, Greenville, NC (US)

(73) Assignee: Sharpe Innovations, Inc., Greenville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/675,322

(22) Filed: Nov. 13, 2012

(65) Prior Publication Data

US 2013/0072068 A1  Mar. 21, 2013

Related U.S. Application Data

(63) Continuation-in-part of application No. 12/963,936, filed on Dec. 9, 2010, now Pat. No. 8,337,239.

(60) Provisional application No. 61/369,223, filed on Jul. 30, 2010.

(51) Int. Cl.
    *H01R 12/00*  (2006.01)
(52) U.S. Cl.
    USPC ........................................ 439/76.1
(58) Field of Classification Search
    USPC ................. 439/55, 76.1, 483, 945, 660, 638; 361/737
    See application file for complete search history.

(56) References Cited

U.S. PATENT DOCUMENTS

| 5,933,328 | A | 8/1999 | Wallace et al. |
| 6,068,186 | A | 5/2000 | Jubert |
| 7,183,636 | B1 | 2/2007 | Boccia et al. |
| 7,347,736 | B2 | 3/2008 | Ni |
| 7,866,996 | B2 | 1/2011 | Achsaf et al. |
| 8,337,239 | B2 * | 12/2012 | Holmes .......................... 439/483 |
| 2002/0076954 | A1 | 6/2002 | Chen et al. |

FOREIGN PATENT DOCUMENTS

| CN | 200959459 Y | 10/2007 |
| DE | 4419073 A1 | 12/1994 |
| DE | 4407173 A1 | 9/1995 |
| EP | 0556970 A1 | 8/1993 |
| EP | 1909219 A2 | 4/2008 |

OTHER PUBLICATIONS

"Fingers-On With the MicroSIM Card Adaptor", http://www.wired.com/gadgetlab/2010/05/fingers-on-with-the-microsimcard-adaptor, Jul. 7, 2010.
Negri Electronics, "Mini-UICC MicroSim Adaptor", http://negrielectronics.com/mini-uicc-microsimadapter.html, Jul. 7, 2010.

* cited by examiner

*Primary Examiner* — Khiem Nguyen
(74) *Attorney, Agent, or Firm* — Ward and Smith, P.A.

(57) ABSTRACT

A SIM card adaptor for allowing use of a smaller format SIM card in an electronic device using a larger format SIM card is provided. The SIM card adaptor may include, an adaptor body having a cutout region defined by walls in the adaptor, the cutout region preferably shaped to receive the smaller format SIM card therein; and the adaptor body may be sized and shaped for use in the electronic device using the larger format SIM card, and wherein the adaptor body includes plastic and/or nylon, carbon fiber, aluminum, or similar material capable of withstanding heat levels up to at least about 200° Fahrenheit without degradation.

20 Claims, 8 Drawing Sheets

SIM CARD ADAPTOR

CROSS-REFERENCE TO RELATED APPLICATION

This application is a continuation-in-part of U.S. patent application Ser. No. 12/963,936, filed on Dec. 9, 2010, which is related to and claims priority to U.S. Provisional Application Patent Application Ser. No. 61/369,223, filed Jul. 30, 2010; the disclosures of which are incorporated by reference in their entirety.

FIELD OF THE INVENTION

The present invention relates to apparatuses and systems for use, for example, with an electronic device, such as a cellular telephone, for allowing use of SIM cards having a smaller format, such as a nano SIM card, with an electronic device constructed for use with a SIM card having a larger format, such as a micro SIM card. More specifically, the invention relates to such a SIM card adaptor, which is hardened and heat resistant to allow for repeated use with different electronic device constructed for use with SIM cards having a larger format.

BACKGROUND OF THE INVENTION

With the recent evolution of smaller format SIM cards, such as micro and nano, and in particular, as a result of their adoption by a number of cellular phone manufacturers, it has become apparent that an SIM card adaptor device is required to allow use of such smaller SIM cards with electronic devices capable of receiving only the larger SIM cards.

More specifically, it is pretty easy to trim a mini or micro SIM card down to fit into a current technology electronic device, such as an iPhone 5, by just simply trimming away excess plastic from around the chip until it fits inside the iPad or iPhone SIM tray. However, what happens if one wishes to go the other way? There may be circumstances where one wishes to use an iPhone 5's nano SIM in a different electronic device. If one was to need to have an iPhone 5 serviced for any reason, they may wish to retain their nano SIM during time of servicing, and use in a device utilizing a micro or mini SIM card.

One solution has been suggested by a micro SIM card adaptor such as that described in an article available at: http://www.wired.com/gadgetlab/2010/05/fingers-on-with-the-microsim-card-adaptor/. Such a device is a piece of plastic cut to hold the micro SIM card and allow loading it back into a regular mini SIM slot. However, such a device still suffers from a number of disadvantages.

More specifically, many electronic device, such as, cellular phones generate a lot of internal heat particularly adjacent to their SIM card tray as a result of operation with the battery. More particularly, such SIM cards are located adjacent or below the battery resulting in very high levels of heat generation. As is well known to those of ordinary skill in the art such levels of heat are damaging to circuits, and often cause the circuits to malfunction, such as may occur with an adaptor such as previously described in the article above, in which it is left open and exposed to high heat levels.

In accordance with the invention, the problems of the prior art with an adaptor enabling use of a SIM card having a smaller format, such as a nano SIM card, with an electronic device, such as a cellular phone, capable of receiving a SIM card having a larger format are avoided as is discussed further hereafter.

SUMMARY OF THE INVENTION

In one embodiment, a SIM card adaptor for allowing use of a smaller format SIM card in an electronic device using a larger format SIM card is provided. The SIM card adaptor may include, an adaptor body having a cutout region defined by walls in the adaptor, the cutout region shaped to receive the smaller format SIM card therein; and the adaptor body sized and shaped for use in the electronic device using the larger format SIM card, and wherein the adaptor body includes plastic and/or nylon, carbon fiber, aluminum, or similar material capable of withstanding heat levels up to at least about 200° Fahrenheit without degradation. The smaller format SIM card may be a nano SIM card and the larger format SIM card may be a mini SIM card. The smaller format SIM card may be a nano SIM card and the larger format SIM card may be a micro SIM card. The material may be resistant to a constant temperature at or about 130° F. The adaptor may further include a floor on the cutout region for supporting the smaller format SIM card therein. The adaptor may further include ridges in the walls of the cutout region to allow the smaller format SIM card to be snapped in, and retained by the ridges. The material may be a nylon blend. The material may be capable of withstanding heat levels up to about 200° Fahrenheit without degradation.

In another embodiment, a SIM card adaptor for allowing use of a nano SIM card in an electronic device using a mini SIM card is provided. The SIM card adaptor may include, an adaptor body having a cutout region defined by walls in the adaptor, the cutout region shaped to receive the nano SIM card therein; and the adaptor body sized and shaped for use in the electronic device using the mini SIM card, and wherein the adaptor body comprises plastic and/or nylon, carbon fiber, aluminum, or similar material capable of withstanding heat levels up to at least about 200° Fahrenheit without degradation.

In yet another embodiment, a SIM card adaptor for allowing use of a nano SIM card in an electronic device using a micro SIM card is provided. The SIM card adaptor may include, an adaptor body having a cutout region defined by walls in the adaptor, the cutout region shaped to receive the nano SIM card therein; and the adaptor body sized and shaped for use in the electronic device using the micro SIM card, and wherein the adaptor body comprises plastic and/or nylon, carbon fiber, aluminum, or similar material capable of withstanding heat levels up to at least about 200° Fahrenheit without degradation.

In still yet another embodiment, a SIM card adaptor for allowing use of a micro SIM card in a device using a mini SIM card is provided. The SIM card adaptor may include, an adaptor body having a cutout region defined by walls in the adaptor, the cutout region shaped to receive the micro SIM card therein; and the adaptor body sized and shaped for use in the electronic device using the mini SIM card, and wherein the adaptor body comprises plastic and/or nylon, carbon fiber, aluminum, or similar material capable of withstanding heat levels up to at least about 250° Fahrenheit without degradation.

These and other advantages and features that characterize the invention are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

BRIEF DESCRIPTION OF THE DRAWINGS

Having briefly described the invention the same will become better understood from the following detailed description made with reference to the appended drawings as follows.

DETAILED DESCRIPTION OF THE INVENTION

Figure 1:
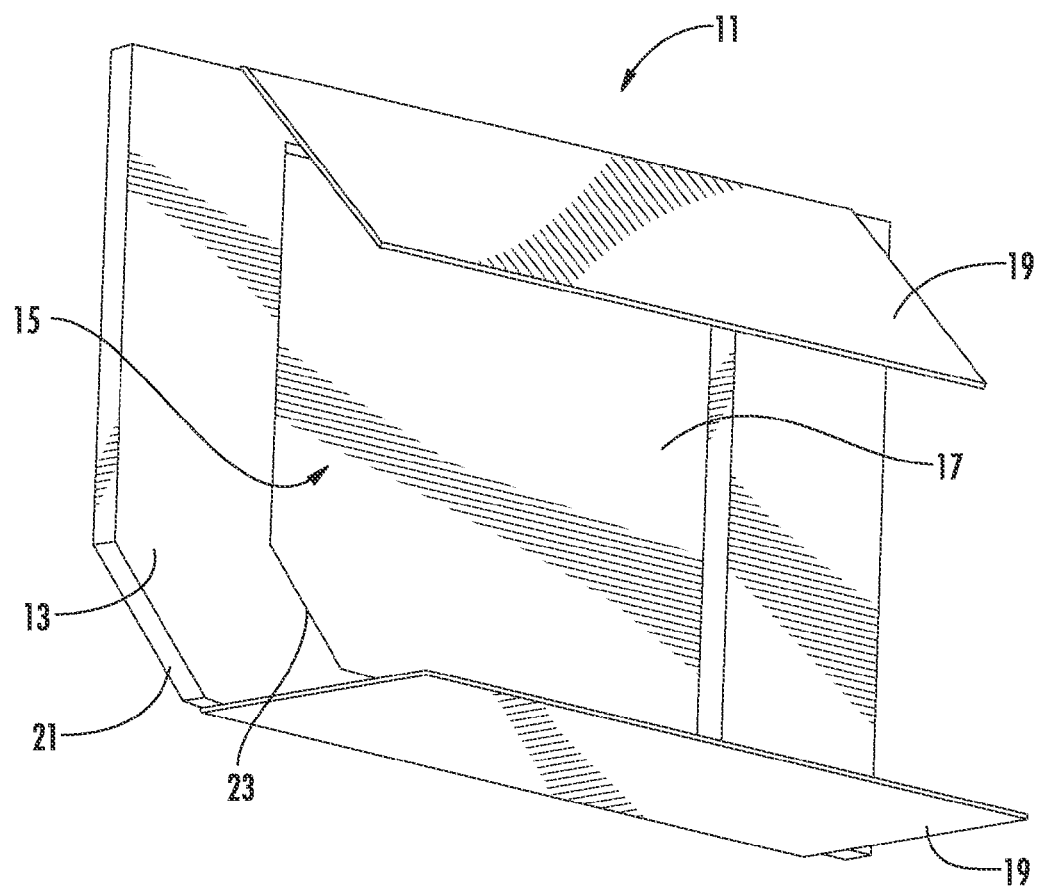
FIG. 1 is a perspective view of one embodiment of the adaptor of the invention shown with cover doors partially open.

One embodiment shown in FIG. 1 illustrates in perspective view a micro SIM card adaptor 11 configured for receiving a micro SIM card therein to allow the micro SIM card to be used in an electronic device that only accepts a mini SIM card format. The SIM card adaptor 11 includes a cutout region 15, and may include a floor 17 on which a micro SIM card can be received and held, contacts (not shown) can be arranged within the cutout region 15, such that they line up with contacts (not shown) on the micro SIM card, and with appropriate contacts (not shown) on the outer edges of the SIM card adaptor 11 for use in an electronic device that uses the mini SIM card format. In this embodiment, a floor support 17 may support the micro SIM card therein and may provide additional heat resistance properties. Cutout region 15 may include an appropriate notch 23 for coinciding with the shape of the micro SIM card. The SIM card adaptor 11 may also include another corresponding notch 21 for being received within an electronic device that uses the mini SIM card format. The SIM card adaptor 11 of this embodiment may include an upper surface 13 and doors 19 that open and close to retain the micro SIM card in place within the SIM card adaptor 11.

Figure 2:
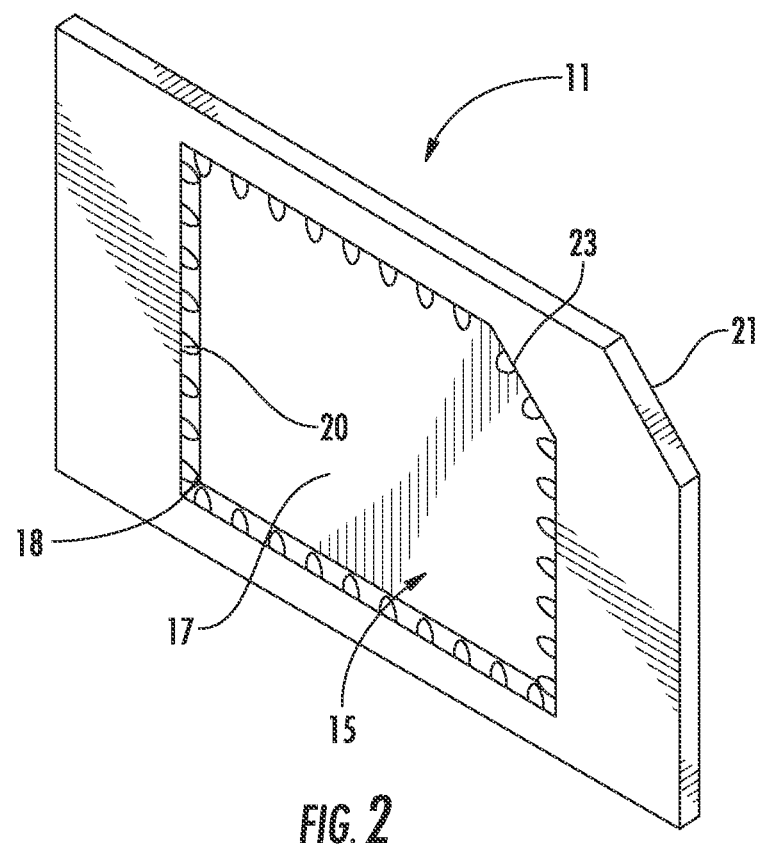
FIG. 2 is a perspective view of an alternative adaptor of the invention shown without doors.
Figure 3:
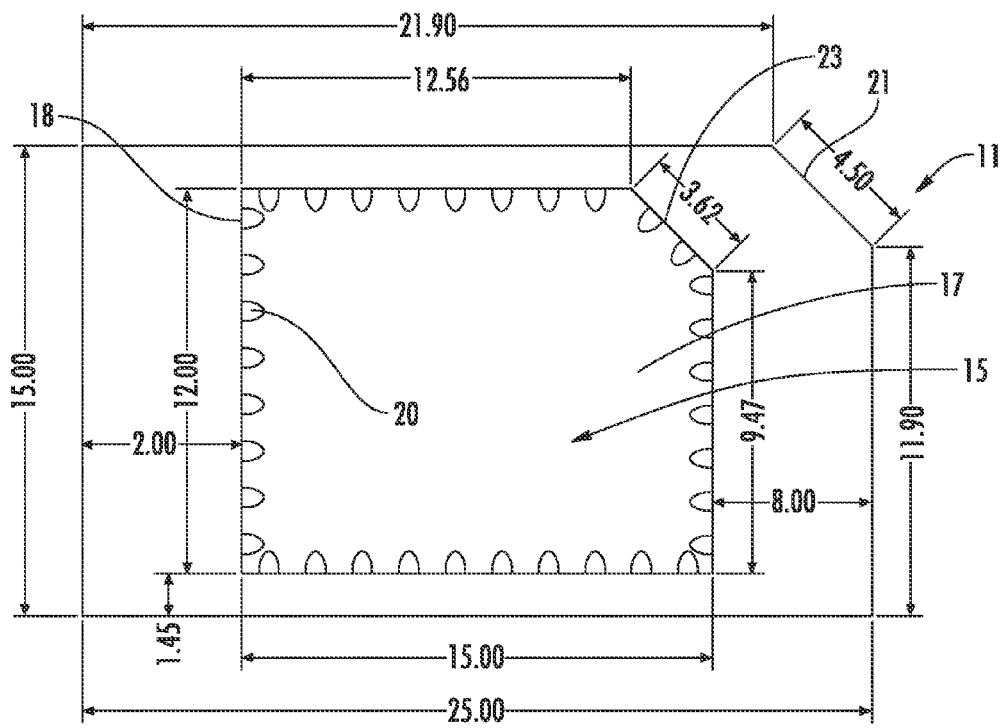
FIG. 3 is a top plan view of the embodiment of FIG. 2 of the adaptor of the invention, showing the cutout region configured for receiving a micro SIM card therein.

FIGS. 2 and 3 illustrate an alternative embodiment without the doors 19.

Figure 4:
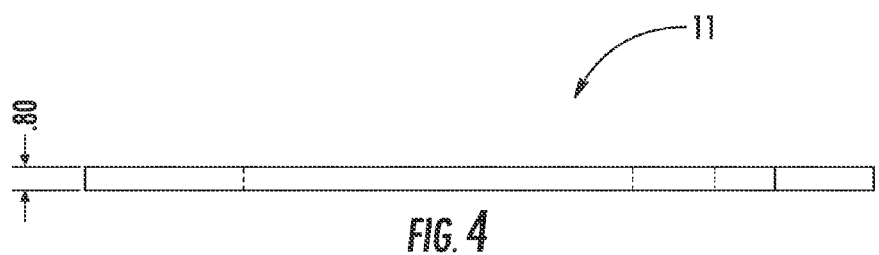
FIG. 4 is a side view of the adaptor of the invention.

As further illustrated in FIGS. 2 and 3, the dimensions of the cutout region 15 in the SIM card adaptor 11 are shown to coincide with typical dimensions for a micro SIM card, and the dimensions of the SIM card adaptor 11 in total correspond to the dimensions of a mini SIM card. Similarly, ridges 20 are provided along walls 18, defining a space for the micro SIM card, to allow it to be "snapped" in. In this embodiment there may or may not be provided the floor support 17. FIG. 4 illustrates approximate thickness and other size dimensions which coincide with and correspond to the thickness and dimensions of a micro SIM card. These dimensions are shown in millimeters.

In a further aspect in constructing the adaptor, preferably plastic and/or nylon, carbon fiber, aluminum, or similar material as described herein may be used. In the embodiment of FIG. 1, the doors 19, as well as the floor support 17, and the complete body of the SIM card adaptor 11 may be made of plastic and/or nylon, carbon fiber, aluminum, or similar material. For the doors 19, conventional hinges can be used, and the doors will preferably remain closed while within a cellular telephone through engagement with various components including the cover and battery within the portion of the cellular telephone that the SIM card adaptor 11 is received.

Figure 5:
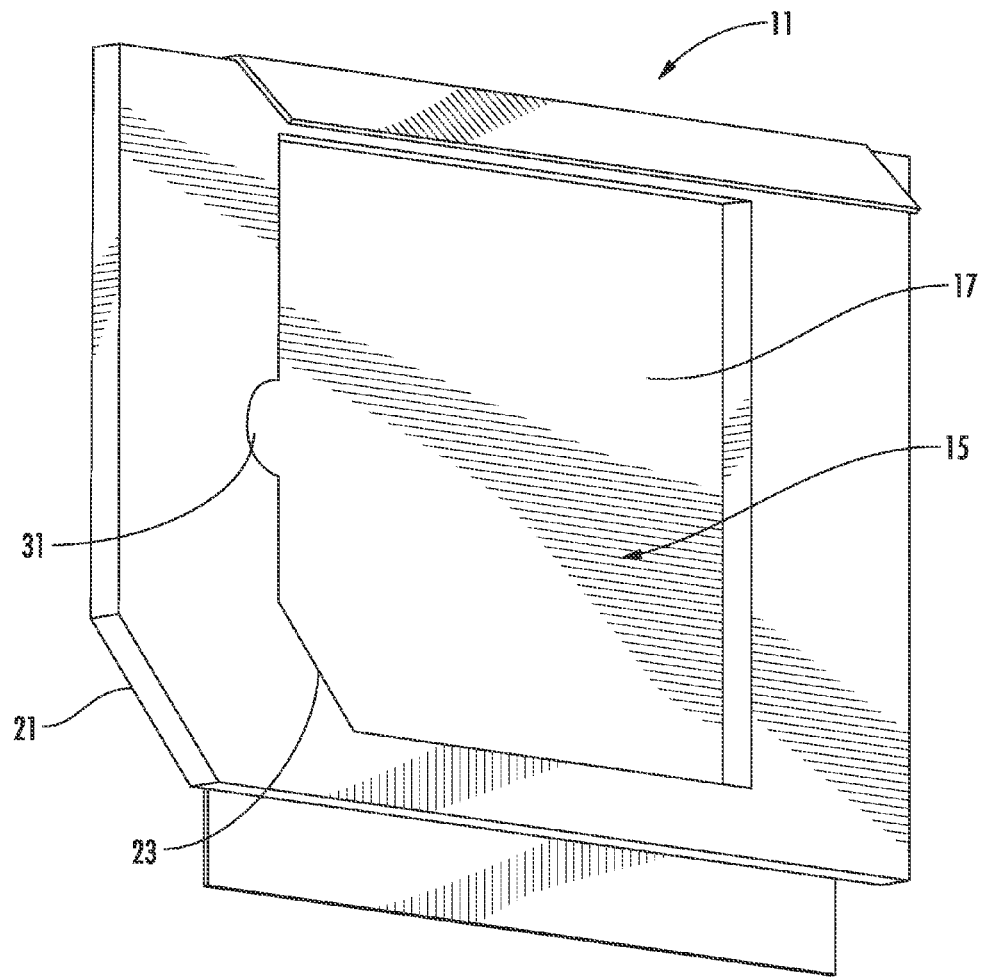
FIG. 5 is a perspective view of another embodiment of the adaptor showing a cutout region to allow easy removal of the micro SIM.

As shown in FIG. 5, the SIM card adaptor 11 in one embodiment can include a cutout 31 for fingernails or other small opening tool to facilitate inserting and removing the micro SIM card and/or to allow opening of the doors 19.

As already noted in the embodiment of FIGS. 2 and 3, walls 18, defining the cutout region 15, may include ridges 20 to allow the micro SIM card to be retained in a "snap in" manner. The ridges 20 may be resilient to provide for ease of snapping in and retention of the micro SIM card.

With respect to FIG. 5, floor 15 is shown, but no doors are employed. This embodiment includes ridges 20 as in FIGS. 2 and 3.

Figure 6:
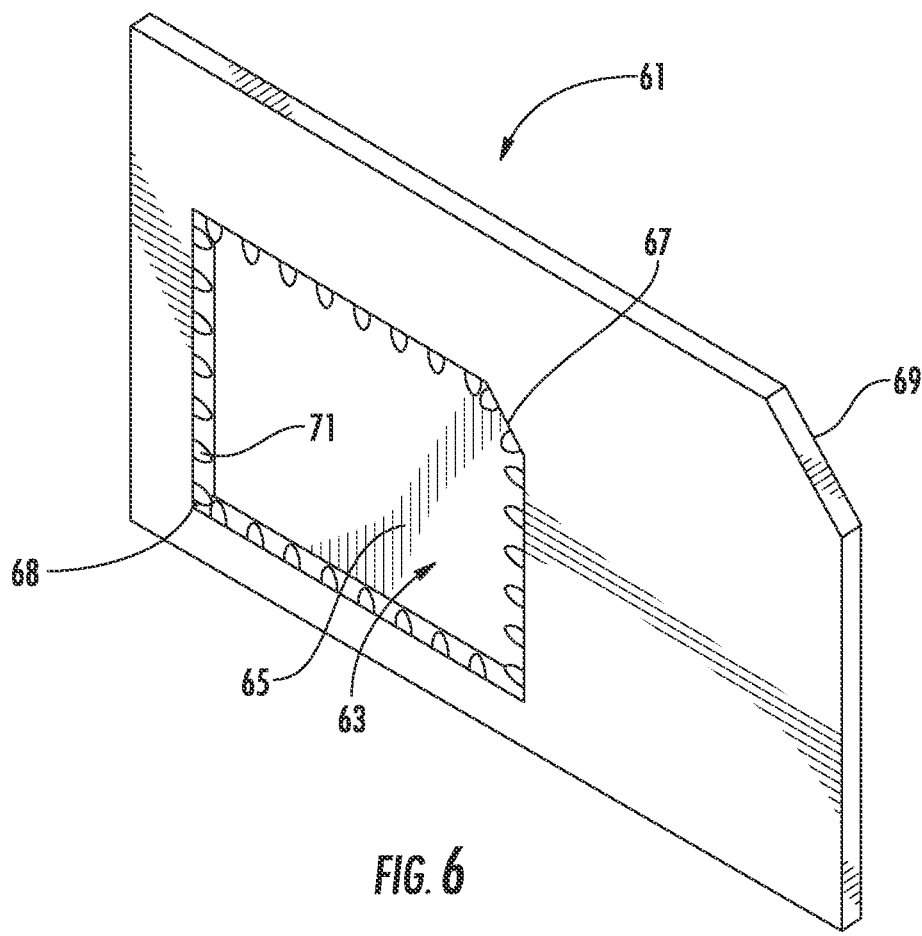
FIG. 6 is a perspective view of an alternate embodiment of the invention showing a mini SIM card with a cutout region configured for receiving a nano SIM card therein.
Figure 7:
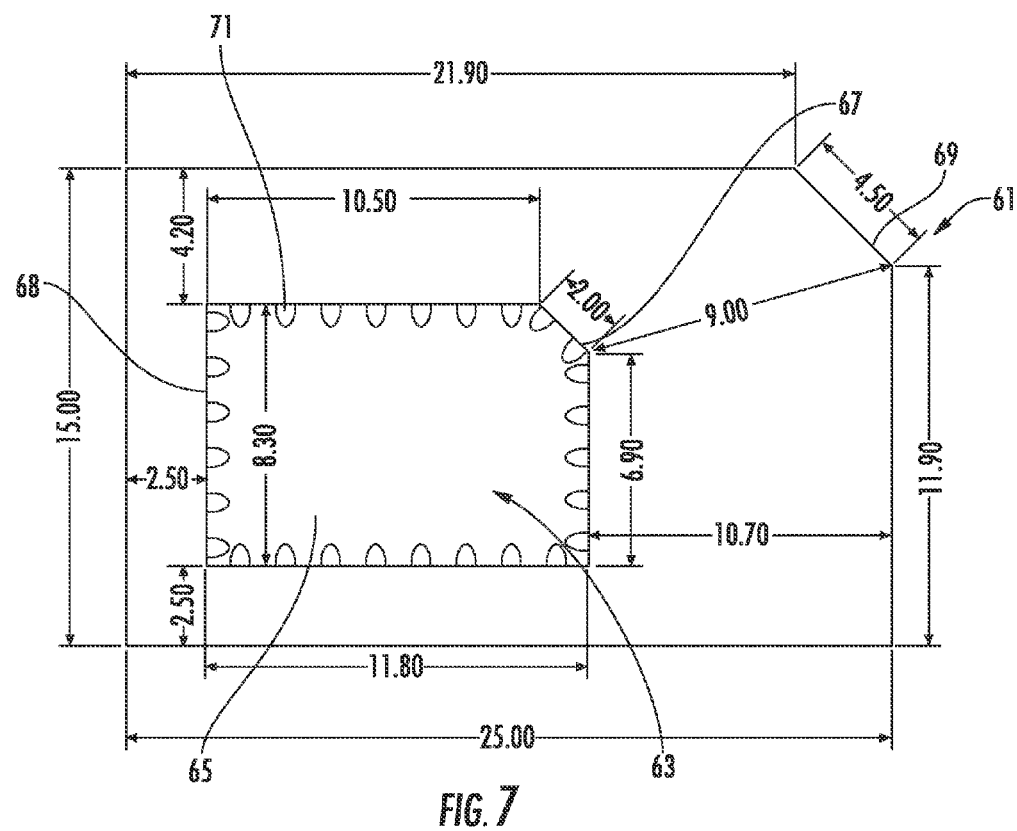
FIG. 7 is a top plan view of the alternate embodiment of FIG. 6.
Figure 8:
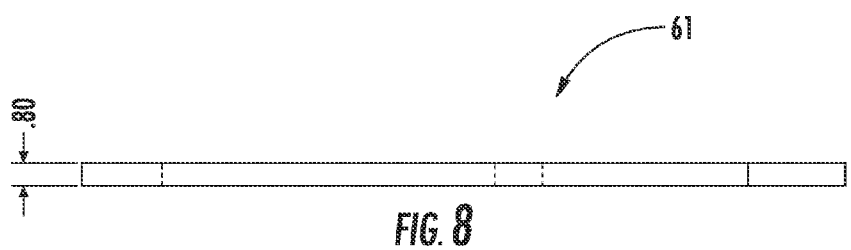
FIG. 8 is a side view of the alternate embodiment of FIG. 6.

In another embodiment, as shown in FIGS. 6-8, a SIM card adaptor 61 configured for receiving a smaller format SIM card, such as a nano SIM card, therein to allow the smaller format SIM card to be used in an electronic device that only accepts a larger format SIM card, such as a mini SIM card. The SIM card adaptor 61 includes a cutout region 63 wherein, for example, the nano SIM card can be received and held. Contacts (not shown) can be arranged within the cutout region 63, such that they line up with the contacts (not shown) on the nano SIM card, and the SIM card adaptor 61 preferably has appropriate contacts (not shown) on outer edges of the SIM card adaptor 61 for use in an electronic device that uses, for example, a mini SIM card. SIM card adaptor 61 may include a floor support 65 on which the nano SIM card may be received and held. Floor support 65 may help support the nano SIM card thereon and may provide additional heat resistance properties, and the cutout region 63 preferably includes an appropriate notch 67 for coinciding with the shape of the nano SIM card. The SIM card adaptor 61 also preferably includes another corresponding notch 69 for being received within the electronic device which accepts the mini SIM card.

As further illustrated in FIGS. 7 and 8, the approximate dimensions of cutout region 63 are shown to coincide with typical dimensions for a nano SIM card, and the dimensions of the SIM card adaptor 61, in total, correspond to the dimensions of a mini SIM card. Similarly, ridges 71 are provided along walls 68, defining a space for the nano SIM card, to allow it to be "snapped" in and securely held in place. In this embodiment, there may or may not be provided floor support 65. FIG. 8 illustrates approximate thickness and other size dimensions which coincide with and correspond to the approximate thickness and dimensions of a nano SIM card. These dimensions are shown in millimeters.

Figure 9:
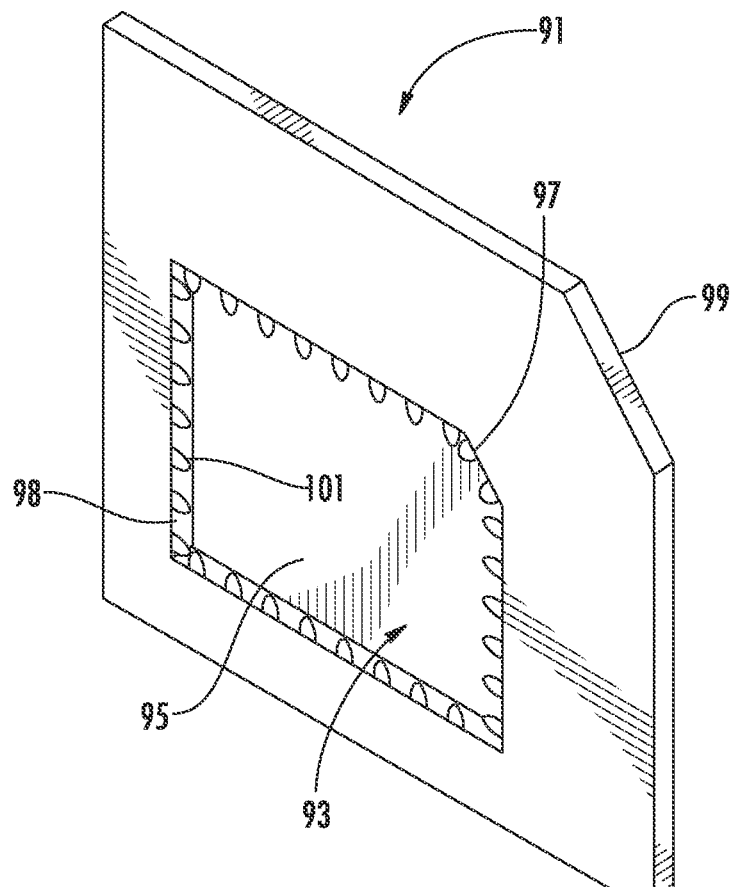
FIG. 9 is a perspective view of another alternate embodiment of the invention showing a micro SIM card with a cutout region configured for receiving a nano SIM card therein.
Figure 10:
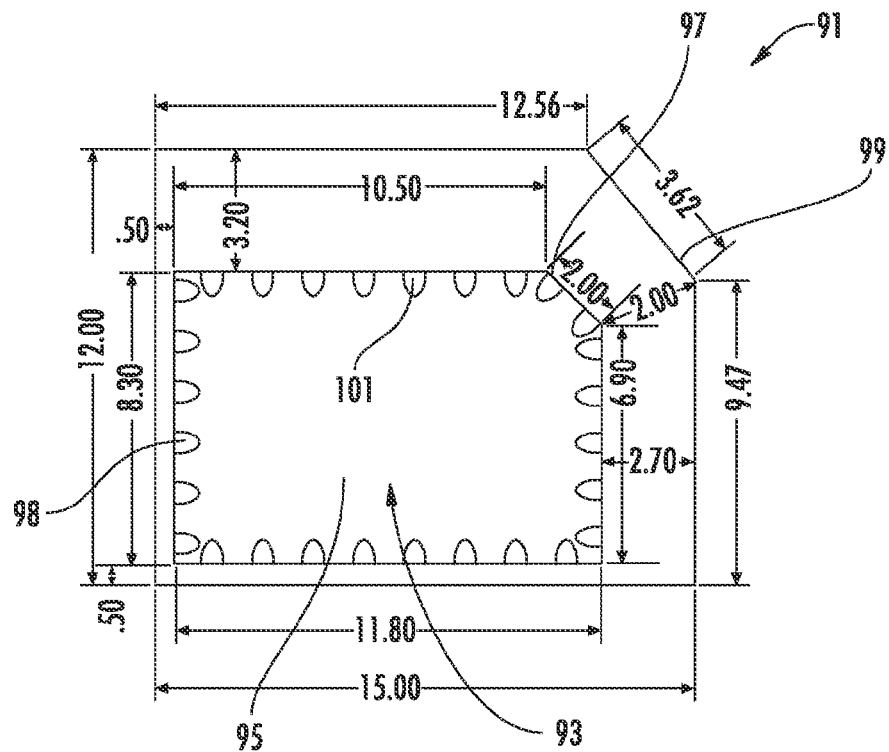
FIG. 10 is a top plan view of the alternate embodiment of FIG. 9.
Figure 11:
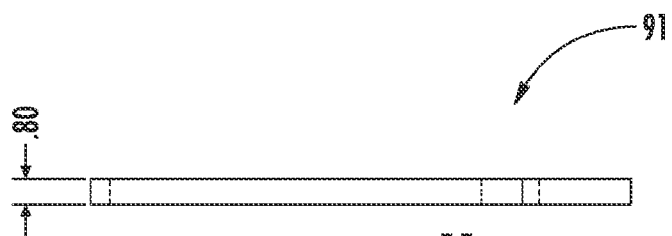
FIG. 11 is a side view of the alternate embodiment of FIG. 9.

In yet another embodiment, as shown in FIGS. 9-11, a SIM card adaptor 91 configured for receiving a smaller format SIM card, such as a nano SIM card, therein to allow the smaller format SIM card to be used in an electronic device that only accepts a larger format SIM card, such as a micro SIM card. The Sim Card adaptor 91 includes a cutout region 93 wherein, for example, the nano SIM card can be received and held. Contacts (not shown) can be arranged within the cutout region 93, such that they line up with the contacts (not shown) on the nano SIM card, and the SIM card adaptor 91 preferably has appropriate contacts (not shown) on outer edges of the SIM card adaptor 91 for use in an electronic device that uses, for example, a micro SIM card. SIM card adaptor 91 may include a floor support 95 on which the nano SIM card may be received and held. Floor support 95 may help support the nano SIM card thereon and may provide additional heat resistance properties, and the cutout region 93 preferably includes an appropriate notch 97 for coinciding with the shape of the nano SIM card. The SIM card adaptor 91 also preferably includes another corresponding notch 99 for being received within the electronic device which accepts the mini SIM card.

As further illustrated in FIGS. 10 and 11, the approximate dimensions of cutout region 93 are shown to coincide with typical dimensions for a nano SIM card, and the dimensions of the SIM card adaptor 91, in total, correspond to the dimensions of a micro SIM card. Similarly, ridges 101 are provided along walls 98, defining a space for the nano SIM card, to allow it to be "snapped" in and securely held in place. In this embodiment, there may or may not be provided floor support 95. FIG. 8 illustrates approximate thickness and other size dimensions which coincide with and correspond to the approximate thickness and dimensions of a nano SIM card. These dimensions are shown in millimeters.

In more specific aspects in selecting the materials in constructing a SIM card adaptor in accordance with the present invention, it is important to appreciate that heat ranges to which electronic devices, such as, cellular telephones, are subjected to are related to batteries in use, of which in the great majority of today's cellular phones are lithium ion batteries. Typically, when the battery is fully charged, the inside temperature of a cellular phone rises to about 113° F. If such batteries and electronic devices are left in a hot car, temperatures can exceed in the range of 130° F. Thus, based on this understanding, it is important that the plastic or materials used are capable of withstanding temperatures of up to about 150° F., and certainly no less than about 130° F.

In constructing the SIM card adaptor of the present invention, preferably plastic and/or nylon, carbon fiber, aluminum, or similar material as described herein may be used. In the embodiments of FIGS. 1, 2, 5, 6 and 9, the complete body and components of the SIM card adaptor 11, 61 and 91 are preferably made of plastic and/or nylon, carbon fiber, aluminum, or similar material. It is important to appreciate that the materials selected, particularly the type of plastic and/or nylon, carbon fiber, aluminum, or similar material used should be able to withstand temperatures of up to about 200° F. to about 250° F. More particularly, the material used is preferably a heat resistant material, as will be readily apparent to those of ordinary skill in the art. With such materials, temperatures of up to about 200° F. to potentially about 250° F. can be withstood at a typical thickness of about 0.80 millimeters.

Having generally described the invention, details and advantages thereof will become better understood from the following examples.

Example I

The adaptors, such as the micro to mini SIM card adaptors, as described herein are made of a plastic/fiber material, more specifically, a plastic blend such as is commercially available from various plastic manufacturing companies. Such a plastic material is a blend in the range of about 80% to about 90% by weight nylon, with the remainder constituting a mid-grade plastic using standard manufacturing techniques. The adaptors were placed on a pan in an oven which had been pre-heated to approximately 170° F. The pan was an ungreased and dry pan, and the adaptors were held in the oven for approximately five (5) minutes and then removed. When removed, the adaptors were cold to the touch, i.e., about room temperature. No signs of wear, melting, peeling, etc., were observed on the adaptors.

Example II

The adaptors of Example I were retained on the pan and the oven pre-heated to approximately 200° F. When 200° F. was reached, the pan and adaptors were placed in the oven for approximately five (5) minutes. The adaptors were then removed. The adaptors showed no signs of wear.

Example III

The adaptors from Example II were retained in the oven at approximately 250° F. for about an additional thirty (30) minutes. When removed, no melting, smoldering or other damage was observed.

Example IV

The same adaptors as before were tested at approximately 300° F. for approximately sixty-five (65) minutes. When removed, no damage was observed.

Example V

Finally, the same adaptors were tested at approximately 400° F. in the oven. After about 15 minutes, the adaptors were observed and discoloration to a light yellow/brown color was observed. The adaptors were removed and no smoldering or melting observed. The test at approximately 400° F. was at more than approximately triple the ideal heat for the material from which the adaptors were made.

While the present invention has been illustrated by a description of various embodiments and while these embodiments have been described in considerable detail, it is not the intention of the Applicant to restrict, or any way limit the scope of the appended claims to such detail. The invention in its broader aspects is therefore not limited to the specific details, representative apparatus and method, and illustrative example shown and described. Accordingly, departures may be made from such details without departing from the spirit or scope of Applicant's general inventive concept.

What is claimed is:

1. A SIM card adaptor for allowing use of a smaller format SIM card in an electronic device using a larger format SIM card, comprising:
   a. an adaptor body having a cutout region defined by walls in the adaptor, the cutout region shaped to receive the smaller format SIM card therein; and
   b. the adaptor body sized and shaped for use in the electronic device using the larger format SIM card, and wherein the adaptor body comprises plastic and/or nylon, carbon fiber, aluminum, or similar material capable of withstanding heat levels up to at least about 200° Fahrenheit without degradation.

2. The SIM card adaptor of claim 1, wherein the smaller format SIM card comprises a nano SIM card and the larger format SIM card comprises a mini SIM card.

3. The SIM card adaptor of claim 1, wherein the smaller format SIM card comprises a nano SIM card and the larger format SIM card comprises a micro SIM card.

4. The adaptor of claim 1, wherein the material is resistant to a constant temperature at or about 130° F.

5. The adaptor of claim 1, further comprising a floor on the cutout region for supporting the smaller format SIM card therein.

6. The adaptor of claim 1, further comprising ridges in the walls of the cutout region to allow the smaller format SIM card to be snapped in, and retained by the ridges.

7. The adaptor of claim 1, wherein the material comprises a nylon blend.

8. The adaptor of claim 7, wherein the material is capable of withstanding heat levels up to about 200° Fahrenheit without degradation.

9. A SIM card adaptor for allowing use of a nano SIM card in an electronic device using a mini SIM card, comprising:
   a. an adaptor body having a cutout region defined by walls in the adaptor, the cutout region shaped to receive the nano SIM card therein; and
   b. the adaptor body sized and shaped for use in the electronic device using the mini SIM card, and wherein the adaptor body comprises plastic and/or nylon, carbon fiber, aluminum, or similar material capable of withstanding heat levels up to at least about 200° Fahrenheit without degradation.

10. The adaptor of claim 9, wherein the material is resistant to a constant temperature at or about 130° F.

11. The adaptor of claim 9, further comprising a floor on the cutout region for supporting the micro SIM card therein.

12. The adaptor of claim 9, further comprising ridges in the walls of the cutout region to allow the micro SIM card to be snapped in, and retained by the ridges.

13. A SIM card adaptor for allowing use of a nano SIM card in an electronic device using a micro SIM card, comprising:
   a. an adaptor body having a cutout region defined by walls in the adaptor, the cutout region shaped to receive the nano SIM card therein; and
   b. the adaptor body sized and shaped for use in the electronic device using the micro SIM card, and wherein the adaptor body comprises plastic and/or nylon, carbon fiber, aluminum, or similar material capable of withstanding heat levels up to at least about 200° Fahrenheit without degradation.

14. The adaptor of claim 13, wherein the material is resistant to a constant temperature at or about 130° F.

15. The adaptor of claim 13, further comprising a floor on the cutout region for supporting the micro SIM card therein.

16. The adaptor of claim 13, further comprising ridges in the walls of the cutout region to allow the micro SIM card to be snapped in, and retained by the ridges.

17. A SIM card adaptor for allowing use of a micro SIM card in a device using a mini SIM card, comprising:
   a. an adaptor body having a cutout region defined by walls in the adaptor, the cutout region shaped to receive the micro SIM card therein; and
   b. the adaptor body sized and shaped for use in the electronic device using the mini SIM card, and wherein the adaptor body comprises plastic and/or nylon, carbon fiber, aluminum, or similar material capable of withstanding heat levels up to at least about 250° Fahrenheit without degradation.

18. The adaptor of claim 17, wherein the material is resistant to a constant temperature at or about 130° F.

19. The adaptor of claim 17, further comprising a floor on the cutout region for supporting the micro SIM card therein.

20. The adaptor of claim 17, further comprising ridges in the walls of the cutout region to allow the micro SIM card to be snapped in, and retained by the ridges.

* * * * *

UNITED STATES PATENT AND TRADEMARK OFFICE
CERTIFICATE OF CORRECTION

| | | |
|---|---|---|
| PATENT NO. | : 8,573,986 B2 | Page 1 of 1 |
| APPLICATION NO. | : 13/675322 | |
| DATED | : November 5, 2013 | |
| INVENTOR(S) | : Holmes | |

It is certified that error appears in the above-identified patent and that said Letters Patent is hereby corrected as shown below:

In the Specifications:
    at column 2, delete lines 58-59, and replace with the following:

-- levels up to at least about 200° Fahrenheit without degradation. --

In the Claims:

Claim 17:
    at column 8, delete lines 22-27, and replace with the following:

-- b. the adaptor body sized and shaped for use in the electronic device using the mini SIM card, and wherein the adaptor body comprises plastic and/or nylon, carbon fiber, aluminum, or similar material capable of withstanding heat levels up to at least about 200° Fahrenheit without degradation. --

Signed and Sealed this
Eleventh Day of February, 2014

Michelle K. Lee
*Deputy Director of the United States Patent and Trademark Office*